US007434389B2

(12) United States Patent
Robel

(10) Patent No.: US 7,434,389 B2
(45) Date of Patent: Oct. 14, 2008

(54) ENGINE SYSTEM AND METHOD OF PROVIDING POWER THEREIN

(75) Inventor: Wade J. Robel, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 5 days.

(21) Appl. No.: 11/370,788

(22) Filed: Mar. 8, 2006

(65) Prior Publication Data

US 2008/0223023 A1    Sep. 18, 2008

(51) Int. Cl.
*F01N 3/10* (2006.01)
(52) U.S. Cl. .............................. 60/303; 60/274; 60/280; 60/295; 60/297; 60/311
(58) Field of Classification Search .................. 60/274, 60/280, 286, 303, 287, 289, 295, 297, 311
See application file for complete search history.

(56) References Cited

U.S. PATENT DOCUMENTS

| | | | | |
|---|---|---|---|---|
| 3,775,971 A | * | 12/1973 | Gadefelt | ........................ 60/606 |
| 4,018,053 A | * | 4/1977 | Rudert et al. | ................. 60/606 |
| 4,060,987 A | | 12/1977 | Fisch et al. | |
| 4,215,549 A | * | 8/1980 | Daeschner | .................... 60/606 |
| 4,449,370 A | * | 5/1984 | Ream | ............................ 60/606 |
| 4,589,254 A | * | 5/1986 | Kume et al. | .................... 60/286 |
| 4,756,359 A | | 7/1988 | Greer | |
| 4,996,845 A | | 3/1991 | Kim | |
| 5,138,835 A | * | 8/1992 | Bender et al. | .................. 60/278 |
| 5,309,718 A | * | 5/1994 | Loving | ......................... 60/722 |
| 5,528,901 A | | 6/1996 | Willis | |
| 5,826,428 A | * | 10/1998 | Blaschke | ...................... 60/303 |
| 6,408,626 B1 | * | 6/2002 | Arnell | ......................... 60/624 |
| 6,536,392 B2 | | 3/2003 | Widener | |
| 6,796,367 B2 | | 9/2004 | Blacquiere et al. | |
| 6,932,148 B1 | | 8/2005 | Brummett et al. | |
| 2003/0070849 A1 | | 4/2003 | Whittaker | |

FOREIGN PATENT DOCUMENTS

JP     06-221137     *    8/1994

* cited by examiner

*Primary Examiner*—Thomas Denion
*Assistant Examiner*—Diem Tran
(74) *Attorney, Agent, or Firm*—Liell + McNeil

(57) ABSTRACT

An engine system includes an internal combustion engine having an exhaust system, and an air supply passage connecting therewith. The engine system includes an auxiliary regeneration device coupled with the exhaust system, and an auxiliary power turbine coupled with the exhaust system and positioned downstream the auxiliary regeneration device. A method of providing power in an internal combustion engine system is further provided, including turning off the engine, moving gases through an exhaust system of the engine, including combusting a fuel in the exhaust system with an auxiliary regeneration device, and operating a power source separate from the engine by rotating an auxiliary power turbine via the gases moving through the exhaust system.

18 Claims, 4 Drawing Sheets

ENGINE SYSTEM AND METHOD OF PROVIDING POWER THEREIN

TECHNICAL FIELD

The present disclosure relates generally to internal combustion engine systems, and relates more particularly to an engine system having an auxiliary power turbine operable to generate power when the engine is shut off.

BACKGROUND

Internal combustion engines are well known and widely used as power sources. Applications for such engines range from small, hand-held machines such as chain saws to relatively large and complex propulsion and electrical power generation systems. Internal combustion engines may be used as primary power and propulsion sources, but may also have a wide variety of auxiliary systems coupled therewith.

On-highway trucks and other mobile work machines, for example, typically include several systems such as heating and cooling, hydraulic systems, air compressors, fuel and oil pumps, engine cooling systems, etc. operably coupled with a power output shaft of an internal combustion engine. During typical operation, the primary engine serves to not only propel such a work machine, but also to drive the various secondary systems. Decades of technological development have resulted in quite sophisticated and efficient engine systems, with a primary engine having a variable load range for powering different subsets of the various components. There are some instances, however, where powering of a secondary system of a work machine is desirable, but the full output power of a primary internal combustion engine is not needed. In addition, while the operating range of many internal combustion engines allows operation at relatively low loads, such operation may not always be optimally efficient or practicable.

It is well known that many on-highway trucks will often idle for extended periods of time, continuing to power various secondary systems of the work machine even when propulsion or other primary power is unnecessary. In particular, when a truck is parked the operator will often run the engine at an approximate idle speed, providing sufficient power to operate the heating or air conditioning system. While it is certainly convenient for an operator to simply park the truck at a truck stop, and keep the engine running, long periods of idling can consume appreciable amounts of fuel and result in wear and tear on the engine, even where the engine load is relatively small. In general terms, long periods of idling are an inefficient way in which to run a relatively large internal combustion engine, as heavy duty engines typically operate with approximately 20% thermal efficiency at idle conditions.

Some manufacturers have developed stand alone engines, known in the art as "pony" engines, which operate separately from a main engine and allow the main engine to be shut down when a truck or other mobile work machine is not traveling. These relatively smaller pony engines tend to have relatively higher efficiencies than the main engine due to lower friction and the ability to operate at a more practical load condition. Moreover, it is known to use the pony engine to assist in initiating operation of the main engine when desired.

In addition to such stand alone pony engines, a variety of other engine modifications have been introduced into the market that are also directed towards reducing energy waste. U.S. Pat. No. 4,996,845 to Kim provides a cooling/heating and power generating device that purportedly utilizes waste heat from an automobile to produce an auxiliary energy source for driving various accessories, including a cooling/heating apparatus, an electric generator, etc. Waste heat from the engine in the form of waste gases is passed through an exhaust tube to transfer heat to a heat exchanger and thenceforth to a cooling medium. Heat from the cooling medium may then be used to drive an expansion turbine to provide a source of power separate from the main engine. While Kim appears to provide one means of recovering energy in an internal combustion engine that might otherwise be lost, it requires that the main engine actually be operated, and therefore suffers from shortcomings similar to many known designs.

The present disclosure is directed to one or more of the problems or shortcomings set forth above.

SUMMARY OF THE DISCLOSURE

In one aspect, an engine system is provided, including an internal combustion engine having an exhaust system defining an upstream end and a downstream end. An air supply passage connects with the exhaust system, and an auxiliary regeneration device is coupled with the exhaust system and includes a fuel igniter. An auxiliary power turbine is coupled with the exhaust system and positioned downstream the auxiliary regeneration device.

In another aspect, the present disclosure provides a method of providing power in an internal combustion engine system. The method includes the steps of turning off the engine, and moving gases through an exhaust system of the engine, including a step of combusting a fuel in the exhaust system with an auxiliary regeneration device. The method further includes the step of operating a power source separate from the engine, including a step of rotating an auxiliary power turbine at least in part via the gases moving through the exhaust system.

In still another aspect, the present disclosure provides an auxiliary power system including an exhaust segment defining an upstream end with an exhaust inlet, and a downstream end including an exhaust outlet. The power system further includes an air supply passage connecting with the exhaust segment, an exhaust regeneration device including a fuel igniter, and an auxiliary power turbine coupled with the exhaust segment and positioned downstream the exhaust regeneration device.

DETAILED DESCRIPTION

Figure 1:
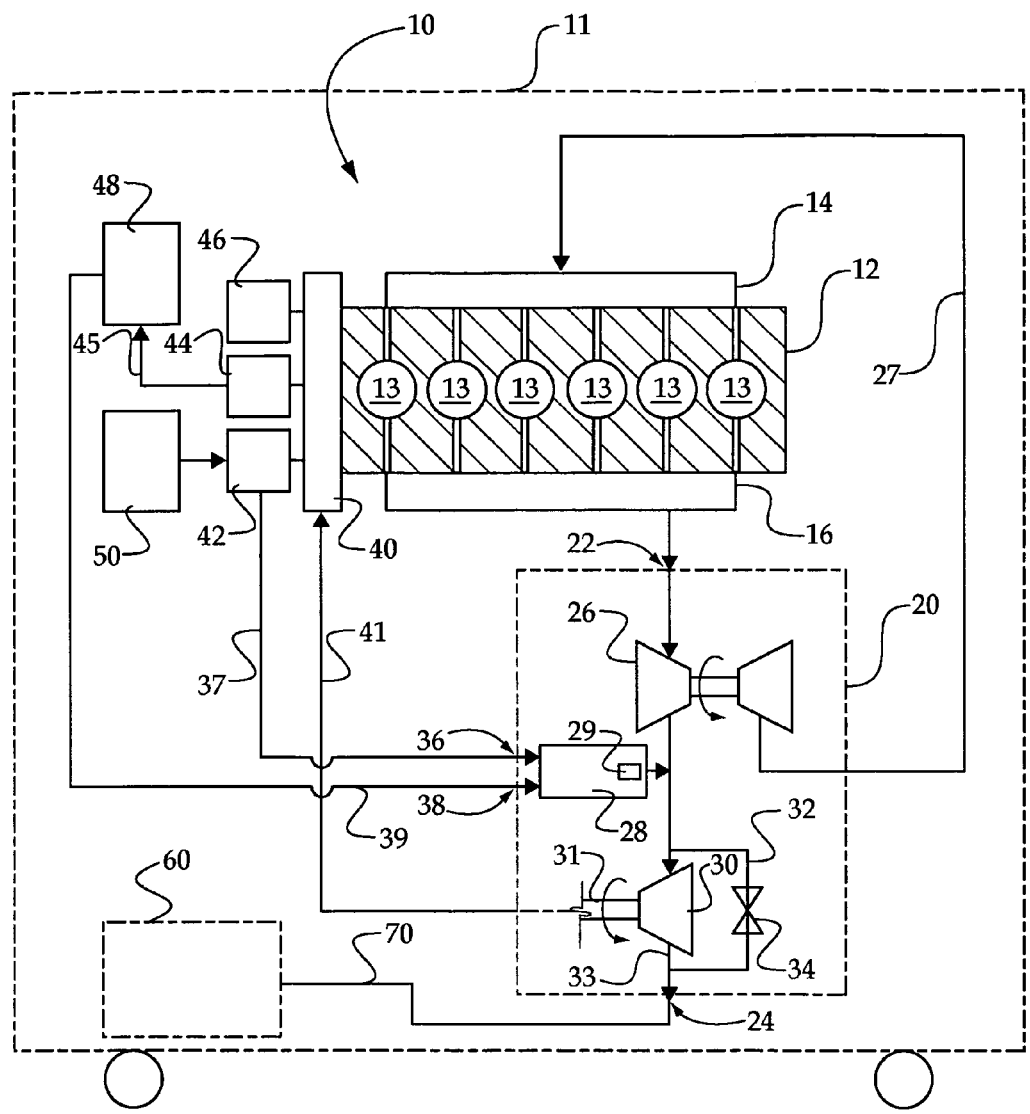
FIG. 1 is a schematic illustration of a work machine with an engine system according to one embodiment of the present disclosure.

Referring to FIG. 1, there is shown a schematic illustration of an engine system 10 according to one embodiment of the present disclosure, shown disposed in a work machine 11. It is contemplated that engine system 10, and the other embodiments described herein, will be well suited for use with work machines such as on-highway trucks, however, the present disclosure is by no means thereby limited. For instance, rather than a mobile work machine, engine system 10 might be part of a stationary system such as a genset, a pumping apparatus, a gas compressor system or a marine application. Engine system 10 includes an internal combustion engine 12 having a plurality of cylinders 13, which serves as a primary engine, and an auxiliary power turbine 30 for providing a secondary power source apart from engine 12, as described herein.

Engine system 10 further includes an intake manifold 14 and an exhaust manifold 16, each coupled with engine 12 in a conventional manner. An exhaust system 20 is connected with engine 12, and includes an exhaust inlet 22 at an upstream end, and an exhaust outlet 24 at a downstream end. A turbocharger 26 may be disposed at least partially within exhaust system 20 and powered via exhaust from engine 12 passing through an exhaust passage 33. A compressed air line 27 extends from turbocharger 26 to intake manifold 14 in a conventional manner. While it is contemplated that many, if not most engine systems according to the present disclosure will be turbocharged engines, the present disclosure is not limited to such a configuration.

Auxiliary power turbine 30 is also positioned at least partially within exhaust system 20 and powered via exhaust in passage 33. Auxiliary power turbine 30 includes an output shaft 31 configured to power at least one driven component, as described herein. A bypass line 32 may be routed around auxiliary power turbine 30 and has an open/closed state that may be controlled via a bypass valve 34.

An auxiliary regeneration device 28 is coupled with exhaust system 20 and is operable to combust a mixture of fuel and air therein. As used herein, the term "auxiliary regeneration device" should be understood to refer to a wide variety of devices disposed within or configured to connect with an exhaust system of an internal combustion engine, and capable of delivering a fuel charge into an exhaust stream of the engine. Such devices may be used to regenerate an exhaust particulate filter via a combustion of fuel within an exhaust system of an internal combustion engine, in particular diesel engines, and a variety of suitable devices are known to those skilled in the art. In the present disclosure, combustion of fuel and air in exhaust system 20 via auxiliary regeneration device 28 may be used to power auxiliary power turbine 30, to provide an auxiliary power source for certain of the components of engine system 10 as desired.

To this end, auxiliary regeneration device 28 will typically include a fuel igniter 29 and is coupled with an air supply passage 39 via an air inlet 38, and a fuel supply passage 37 via a fuel inlet 36. Fuel supply passage 37 will typically connect with a fuel pump 42 or other fuel supply, whereas air supply passage 39 will typically connect with a source of compressed air such as an air storage tank 48. A source of compressed air is contemplated to be desirable for at least initial operation of auxiliary power turbine 30, and in many instances may provide a practical implementation strategy, although not a necessary component of engine system 11. Air storage tank 48 may be the air storage tank used to power pneumatic components of work machine 11 such as conventional air brakes, or it might be a separate air storage tank. An air compressor 44 may be coupled with air storage tank 48 via a compressed air supply passage 45. Embodiments are contemplated wherein, rather than connecting with an air storage tank, auxiliary regeneration device 28 is connected directly to an air compressor.

Output shaft 31 of auxiliary power turbine 30 may be configured to rotate components of a gear train 40. For illustrative purposes arrow 41 is shown connecting output shaft 31 with gear train 40. Those skilled in the art will appreciate that auxiliary power turbine 30 may be positioned adjacent engine 12 in certain embodiments. For instance, where auxiliary power turbine 30 comprises a component of a turbocompound system, shaft power derived from the rotation of auxiliary power turbine 30 may be selectively linked with an engine crankshaft (not shown). A clutch (not shown) may be used to couple output shaft 31 with gear train 40, such that output shaft 31 of auxiliary power turbine 30 may be rotated independently of gear train 40. Likewise, a clutch may be provided for selectively coupling/decoupling output shaft 31 with the engine crankshaft.

Gear train 40 is in turn coupled with air compressor 44 and may also be coupled with fuel pump 42. An air conditioner 46, for example including a compressor (not shown), may also be coupled with gear train 40 and operable to provide cooling to an operator cabin 60. Exhaust passage 33 may also be connected with a heat transfer passage 70 that connects with operator cabin 60. Hot gases, exhaust or air or some other fluid heated by the exhaust gases from auxiliary power turbine 30 may be transported through a heat exchanger (not shown) adjacent or in an operator cabin 60 to heat the same.

A battery 50 may further be provided and electrically connected with fuel pump 42, such that fuel pump 42 may be driven after engine 12 has been shut down, but before auxiliary power turbine 30 is operating. Similarly, any of the other driven components may be battery powered, and the power connection configuration of FIG. 1 is illustrative only. In further embodiments, described herein, an alternator is powered by auxiliary power turbine 30.

Figure 2:
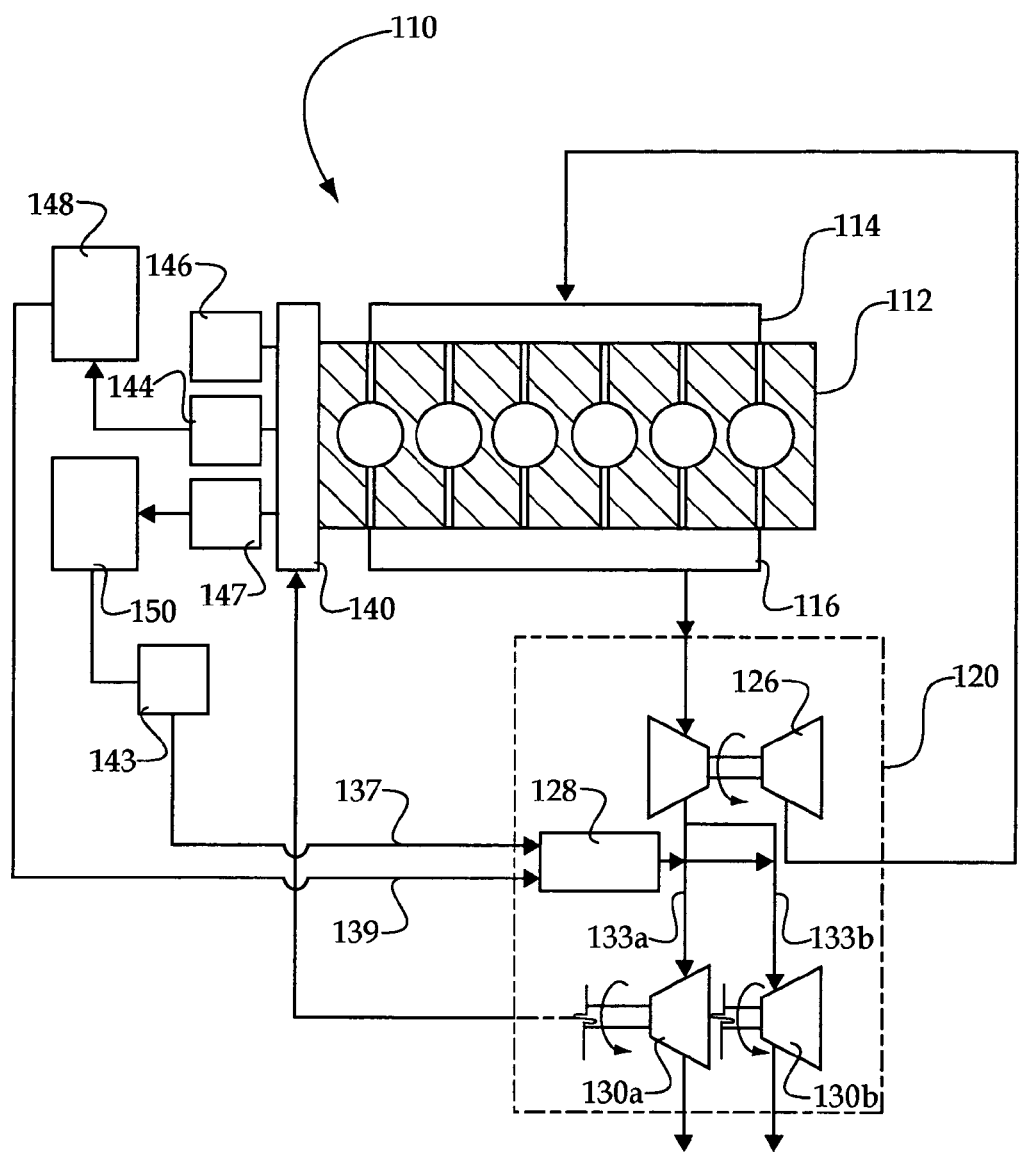
FIG. 2 is a schematic illustration of another engine system according to a second embodiment of the present disclosure.

Turning now to FIG. 2, there is shown an engine system 110 according to another embodiment of the present disclosure. Engine system 110 is similar to engine system 10 of FIG. 1, but includes several important differences. For instance, rather than a single auxiliary power turbine shown in the context of a turbocompound system, engine system 110 includes parallel turbocompound auxiliary power turbines. Reference numerals similar to those of FIG. 1 are used in FIG. 2 to identify components similar to those shown in engine system 10 of FIG. 1. Engine system 110 will typically include an internal combustion engine 112 having an intake manifold 114 and an exhaust manifold 116. An exhaust system 120 connects with exhaust manifold 116, and may include a turbocharger 126 coupled therewith. A first exhaust passage 133a connects with turbocharger 126, as does a parallel second exhaust passage 133b. First and second auxiliary power turbines 130a and 130b may be disposed fluidly in parallel and positioned at least partially within exhaust passages 133a and 133b, respectively. In certain embodiments, turbines 130a and 130b may comprise components of a parallel turbocompounding system. An auxiliary regeneration device 128 is also coupled with exhaust system 120 and operable to combust fuel and air therein. Similar to the embodiment of FIG. 1, combustion of fuel and air via auxiliary regeneration device 128 powers auxiliary power turbines 130a and 130b.

As in the embodiment of FIG. 1, a fuel supply passage 137 and an air supply passage 139 connect with auxiliary regeneration device 128. Also similar to the embodiment of FIG. 1, an air storage tank 148 and a fuel pump 143 may be provided. Engine system 110 may further include a gear train 140 coupled with one or more of an air conditioner 146, an air compressor 144 and an alternator 147. Alternator 147 may be electrically connected with a battery 150 which is in turn configured to power a fuel pump 143.

Figure 3:
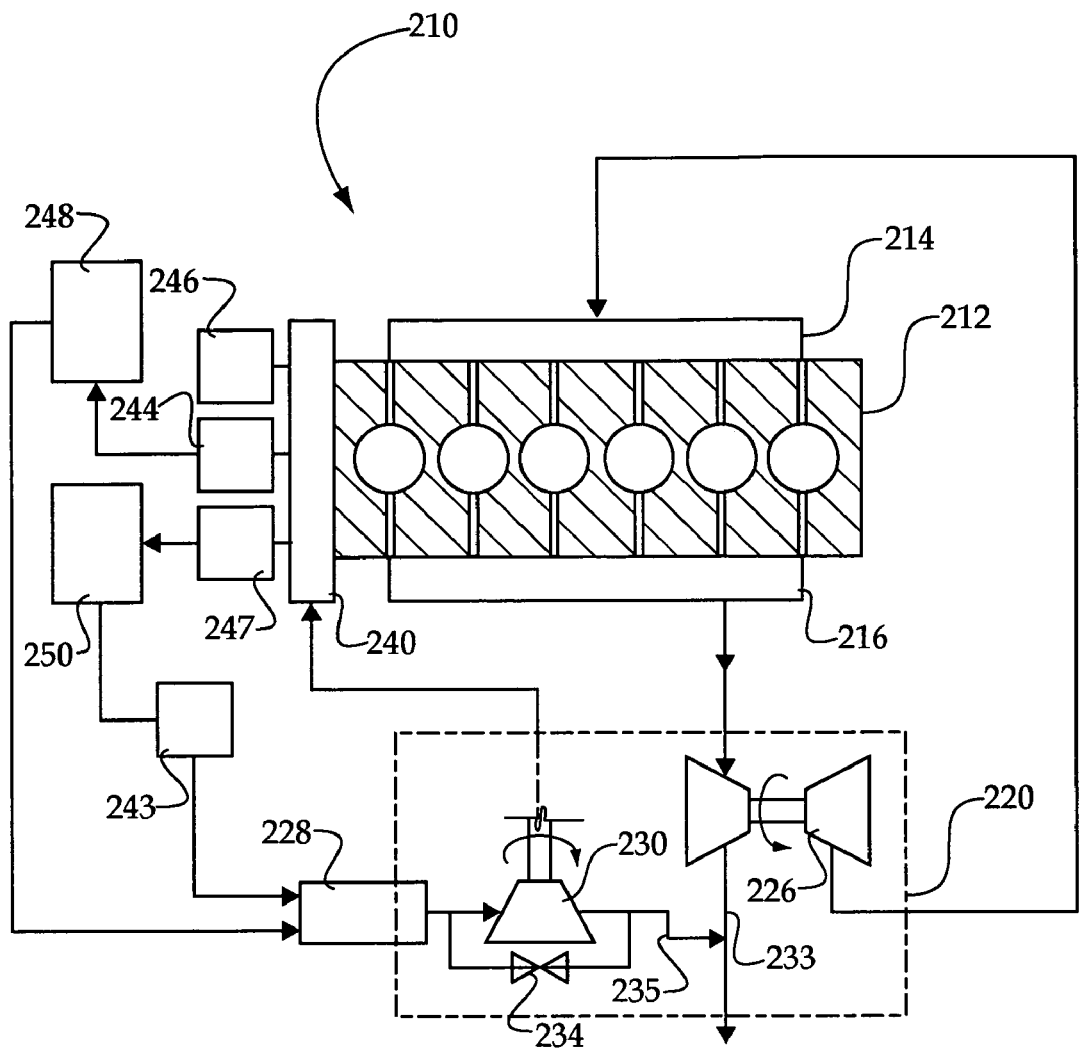
FIG. 3 is a schematic illustration of still another engine system according to a third embodiment of the present disclosure.

Turning to FIG. 3, there is shown yet another engine system 210 according to a third embodiment of the present disclosure. Engine system 210 has a number of similarities with the embodiments of FIGS. 1 and 2, but several important differences. For instance, rather than a turbocompound system, engine system 210 includes an auxiliary power turbine disposed in a branch passage connecting with the exhaust system, as described herein. In FIG. 3, numerals similar to those used in the preceding embodiments are used to identify similar features. Engine system 210 will typically include an internal combustion engine 212 having an intake manifold 214 and an exhaust manifold 216. An exhaust system 220 connects with exhaust manifold 216, and includes a turbocharger 226 disposed at least partially within an exhaust passage 233. An auxiliary power turbine 230 is disposed at least partially within another exhaust passage 235 which may connect with exhaust passage 233, and is coupled with a gear train 240. An auxiliary regeneration device 228 is configured to combust fuel and air in exhaust system 220 to rotate auxiliary power turbine 230, and to regenerate a particulate filter disposed in exhaust system 220. A bypass valve 234 may be provided to allow device 228 to connect with exhaust system 220 apart from turbine 230. An air storage tank 248, battery 250 and fuel pump 243 will further typically be provided. An alternator 247, air compressor 244 and air conditioner 246 may be coupled with gear train 240.

INDUSTRIAL APPLICABILITY

Figure 4:
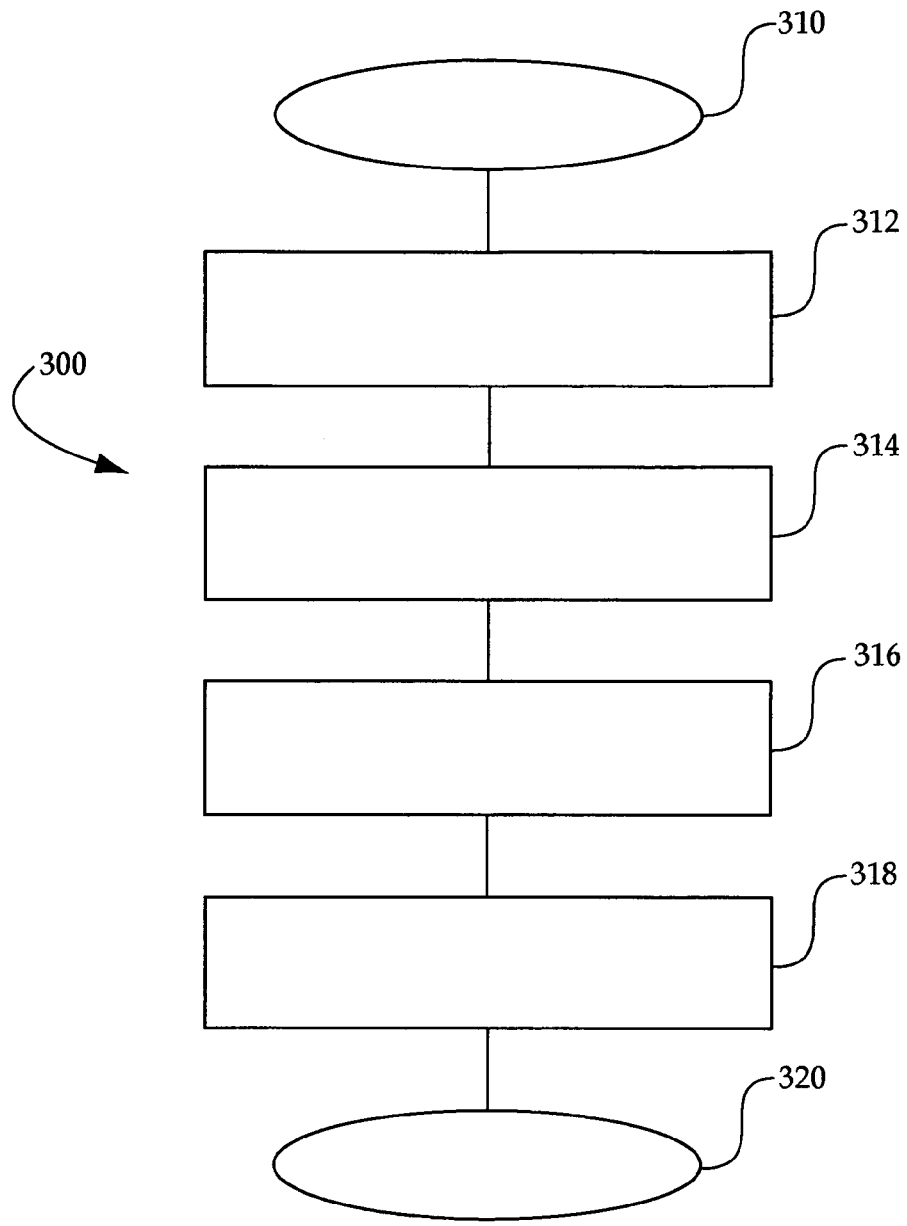
FIG. 4 is a flow chart illustrating an exemplary operating process for an engine system according to the present disclosure.

Referring to FIG. 4, there is shown a flow chart illustrating an exemplary operating process 300 according to one embodiment of the present disclosure. Although the present operating process is discussed in the context of engine system 10 of FIG. 1, the description is similarly applicable to all contemplated embodiments of the present disclosure. The process 300 begins at a START 310, and thenceforth proceeds to step 312 wherein engine 12 is turned off. From step 312, the process may proceed to step 314 wherein fuel and pressurized air may be delivered to auxiliary regeneration device 28. From step 312, the process may proceed to step 316 wherein auxiliary regeneration device 28 is used to combust a mixture of fuel and air in exhaust system 20. From step 316, the process may proceed to step 318, which includes rotating auxiliary power turbine 30. From step 318, the process may proceed to FINISH 320.

Once operation of auxiliary power turbine 30 is initiated, it may continue to be powered by intermittently injecting fuel into exhaust system 20 via auxiliary regeneration device, and igniting the same with fuel igniter 29. Each fuel injection and subsequent ignition will provide expanding combustion gases in exhaust system 20 which will continue to drive rotation of turbine 30. Alternative strategies are contemplated, however, wherein continuous fuel injection might be employed to operate auxiliary power turbine 30 similar to a gas turbine engine.

It may be desirable to block fluid communications between exhaust system 22 and engine 12 when operating auxiliary power turbine 30. Thus, the method may further include a step of blocking fluid communications therebetween. It is contemplated that air passage 39 will provide one design for supplying air to auxiliary regeneration device 28, however, in other contemplated embodiments air might be supplied to exhaust system 20, and hence auxiliary regeneration device 28 via engine 12 itself. In other words, the various intake and exhaust valves associated with one or more of cylinders 13 might be positioned in an open state such that air could be supplied through engine 12.

While auxiliary power turbine will typically be used to power at least one driven component of engine system 11, it will generally be desirable to decouple the component from the engine prior to powering it with auxiliary power turbine 30. For instance, fuel pump 42 may operate as a conventional fuel pump when engine 12 is turned on, being driven by a belt, gear interface, etc. coupled with engine 12. Because powering fuel pump 42 with auxiliary power turbine 30 could otherwise cause the belt or gear coupling with engine 12 to rotate, fuel pump 42 and any other driven component will typically be decoupled from engine 12 prior to driving the same with auxiliary power turbine 30.

When it is desirable to start engine 12, auxiliary power turbine 30 may be selectively coupled via output shaft 31 with the crankshaft of engine 12 to initiate rotating thereof. In such an embodiment, the role for a separate engine starter is reduced or eliminated. Moreover, hot exhaust gases from auxiliary power turbine 30 may be used to directly heat components of engine 12 such as the engine block, or indirectly by heating the engine oil. This may facilitate starting, and also can ameliorate undesirable emissions during cold starting, as not only the engine, but also the aftertreatment system, is warm and thus fully or close to fully operational.

The engine systems of the present disclosure thus provide for an auxiliary power source separate from the engine which may be used to drive separate engine systems at a relatively higher efficiency than is possible by running the main engine at low loads. The auxiliary power source may also be used to assist in starting the engine. By using existing hardware such as an auxiliary regeneration device in combination with a turbocompound auxiliary power turbine, additional weight, cost and complexity of the engine system is minimal.

The present description is for illustrative purposes only, and should not be construed to narrow the breadth of the present disclosure in any way. Thus, those skilled in the art will appreciate that various modifications might be made to the presently disclosed embodiments without departing from the intended spirit and scope of the present disclosure. For example, while several illustrative examples of turbocharger and turbocompound systems are described herein, a multiplicity of other designs is possible. Rather than a turbine positioned downstream a turbocharger, an engine system according to the present disclosure might include an auxiliary power turbine positioned immediately downstream the exhaust manifold of the engine. Further, rather than a separate auxiliary power turbine, a turbine of a turbocharger itself might be used, or a supercharger system adapted to provide auxiliary power. Similarly, the combination of components driven via the auxiliary power turbine, and those powered with a battery may be varied from the specific examples described herein. For instance, all of the driven components might be electrically powered, and the auxiliary power turbine used solely for driving an alternator to charge the battery. Other aspects, features and advantages will be apparent upon an examination of the attached drawings and appended claims.

What is claimed is:

1. An engine system comprising:
   an internal combustion engine having an exhaust system defining an upstream end and a downstream end;
   an air supply passage connecting with said exhaust system;
   an auxiliary regeneration device coupled with said exhaust system and including a fuel igniter;
   a particulate filter positioned in the exhaust system at a location for regeneration by the auxiliary regeneration device;
   an auxiliary power turbine coupled with said exhaust system and positioned downstream said auxiliary regeneration device: and
   a turbocharger coupled with said exhaust system and positioned upstream said auxiliary regeneration device.

2. The engine system of claim 1 wherein said air supply passage comprises an air inlet connecting with said exhaust system at a position upstream said auxiliary regeneration device.

3. The engine system of claim 2 further comprising a compressed air supply connecting with said air inlet, and a pressurized fuel supply connecting with said auxiliary regeneration device.

4. The engine system of a claim 3 further comprising at least one of an operator cabin heater and an air conditioner operably coupled with said auxiliary power turbine.

5. The engine system of claim 3 further comprising an alternator, wherein said compressed air supply comprises an air compressor and said fuel supply comprises a fuel pump, and wherein said auxiliary power turbine includes a power output shaft configured to power at least one of said alternator, said air compressor and said fuel pump.

6. The engine system of claim 5 further comprising a compressed air storage device connecting with said air inlet and with said air compressor.

7. The engine system of claim 5 further comprising a battery electrically connected with said alternator and electrically connected with at least one of said air compressor and said fuel pump, said auxiliary power turbine being configured to power said alternator.

8. The engine system of claim 1 further comprising a gear train having a plurality of power outputs and coupled with said auxiliary power turbine.

9. The engine system of claim 8 wherein said auxiliary power turbine comprises a component of a turbocompounding apparatus for said engine.

10. An engine system comprising:
an internal combustion engine having an exhaust system defining an upstream end and a downstream end;
an air supply passage connecting with said exhaust system;
an auxiliary regeneration device coupled with said exhaust system and including a fuel igniter;
an auxiliary power turbine coupled with said exhaust system and positioned downstream said auxiliary regeneration device;
said air supply passage comprises an air inlet connecting with said exhaust system at a position upstream said auxiliary regeneration device;
a compressed air supply connecting with said air inlet, and a pressurized fuel supply connecting with said auxiliary regeneration device;
a turbocharger coupled with said exhaust system and positioned upstream said auxiliary regeneration device; and
wherein said exhaust system further includes an exhaust bypass line configured to bypass said auxiliary power turbine and having an adjustable bypass valve disposed at least partially therein.

11. An engine system comprising:
an internal combustion engine having an exhaust system defining an upstream end and a downstream end;
an air supply passage connecting with said exhaust system;
an auxiliary regeneration device coupled with said exhaust system and including a fuel igniter;
an auxiliary power turbine coupled with said exhaust system and positioned downstream said auxiliary regeneration device;
said air supply passage comprises an air inlet connecting with said exhaust system at a position upstream said auxiliary regeneration device;
a compressed air supply connecting with said air inlet, and a pressurized fuel supply connecting with said auxiliary regeneration device;
a turbocharger coupled with said exhaust system and positioned upstream said auxiliary regeneration device; and
wherein said auxiliary power turbine is a first auxiliary power turbine, said engine system further comprising a second auxiliary power turbine positioned fluidly in parallel with said first auxiliary power turbine.

12. An engine system comprising:
an internal combustion engine having an exhaust system defining an upstream end and a downstream end;
an air supply passage connecting with said exhaust system;
an auxiliary regeneration device coupled with said exhaust system and including a fuel igniter; and
an auxiliary power turbine coupled with said exhaust system and positioned downstream said auxiliary regeneration device;
said air supply passage comprises an air inlet connecting with said exhaust system at a position upstream said auxiliary regeneration device;
a compressed air supply connecting with said air inlet, and a pressurized fuel supply connecting with said auxiliary regeneration device;
said exhaust system comprises a primary exhaust passage coupled with an exhaust manifold of said engine and a secondary exhaust passage connecting with said primary exhaust passage, said auxiliary power turbine and said auxiliary regeneration device being disposed within said secondary exhaust passage; and
said engine system further comprises a turbocharger disposed within said primary exhaust passage.

13. A method of operating an internal combustion engine system comprising the steps of:
turning off the engine to cease engine exhaust flow through a turbocharger of an exhaust system;
moving gases through the exhaust system of the engine, including a step of combusting a fuel in the exhaust system with an auxiliary regeneration device;
regenerating a particulate filter with the auxiliary regeneration device; and
operating a power source separate from the engine, including a step of rotating an auxiliary power turbine at least in part via the gases moving through the exhaust system.

14. The method of claim 13 wherein the operating step further comprises a step of rotating a power output shaft of the auxiliary power turbine.

15. The method of claim 14 further comprising the steps of:
after turning off the engine, blocking fluid communications between the exhaust system and the engine;
decoupling at least one driven component from the engine; and
powering the at least one driven component with the power output shaft of the auxiliary power turbine.

16. The method of claim 15 wherein the powering step comprises powering a subset of an alternator, an air compressor, a fuel pump, a heater and an air conditioner.

17. The method of claim 14 further comprising the step of powering the engine, including coupling the power output shaft of the auxiliary power turbine with a crankshaft of the engine.

18. An auxiliary power system comprising:
an exhaust segment defining an upstream end and a downstream end, said exhaust segment including an exhaust inlet and an exhaust outlet;
an air supply passage connecting with said exhaust segment;
an auxiliary regeneration device including a fuel igniter;
a particulate filter positioned for regeneration by the auxiliary regeneration device;
an auxiliary power turbine coupled with said exhaust segment and positioned downstream said auxiliary regeneration device; and
a turbocharger coupled with the exhaust segment and positioned upstream from said auxiliary regeneration device.

* * * * *